United States Patent [19]
Nagai

[11] Patent Number: 6,019,184
[45] Date of Patent: Feb. 1, 2000

[54] AUTOMATED VEHICLE

[75] Inventor: Takaaki Nagai, Kawagoe, Japan

[73] Assignee: Honda Giken Kogyo Kabushiki Kaisha, Tokyo, Japan

[21] Appl. No.: 08/964,960

[22] Filed: Nov. 5, 1997

[30] Foreign Application Priority Data

Nov. 22, 1996 [JP] Japan .................................. 8-312116

[51] Int. Cl.⁷ ..................................................... B62D 1/24
[52] U.S. Cl. ............................................ 180/167; 701/49
[58] Field of Search ................................... 180/167, 168, 180/169; 701/208, 49, 36

[56] References Cited

U.S. PATENT DOCUMENTS

| | | | |
|---|---|---|---|
| 3,625,303 | 12/1971 | Cameron | 180/169 |
| 4,223,756 | 9/1980 | Bertelsbeck | 180/169 |
| 4,515,235 | 5/1985 | Yamamoto et al. | 180/168 |
| 4,658,928 | 4/1987 | Seo | 180/168 |
| 4,908,557 | 3/1990 | Sudare et al. | 180/168 |
| 4,932,618 | 6/1990 | Davenport et al. | 180/168 |
| 4,990,841 | 2/1991 | Elder | 180/168 |
| 4,996,468 | 2/1991 | Field et al. | 180/169 |
| 5,216,605 | 6/1993 | Yardley et al. | 180/168 |
| 5,292,185 | 3/1994 | Johann | 180/169 |
| 5,313,190 | 5/1994 | Clayton et al. | 180/167 |
| 5,488,559 | 1/1996 | Seymour | 701/208 |
| 5,810,105 | 9/1998 | Trainer | 180/169 |
| 5,881,832 | 3/1999 | Zitz et al. | 180/169 |
| 5,938,707 | 8/1999 | Uehara | 180/167 |

FOREIGN PATENT DOCUMENTS

| | | | |
|---|---|---|---|
| 709962 | 5/1965 | Canada | 180/168 |
| 292309 | 11/1988 | Japan | 180/168 |
| 200416 | 8/1989 | Japan | 180/168 |

*Primary Examiner*—J. J. Swann
*Assistant Examiner*—Frank Vanaman
*Attorney, Agent, or Firm*—Lyon & Lyon LLP

[57] ABSTRACT

An automated vehicle for performing automated driving control while successively detecting magnetic fluxes caused by magnetic nails embedded in a cruising lane at predetermined intervals comprises a magnetic sensor for detecting the magnetic fluxes caused by the magnetic nails, and sensor moving means for vertically moving the magnetic sensor in response to a change in a road clearance of the vehicle so as to keep a constant clearance between the magnetic sensor and each of the magnetic nails.

This automated vehicle drives itself on a road in which magnetic nails are embedded, while detecting the magnetism (magnetic flux) of the magnetic nails. During this self-driving operation, when the vehicle moves up and down due to the damping and pitching of the vehicle, irregularities of the road surface, or the like, the sensor moving means is actuated so as to vertically move the magnetic sensor in response to such a vertical movement of the vehicle, whereby the clearance between the magnetic sensor and each of the magnetic nails (road surface) is kept constant. As a result, even when the vehicle moves up and down during cruising, the magnetic sensor can detect the magnetic nails without hindrance.

7 Claims, 5 Drawing Sheets

AUTOMATED VEHICLE

FIELD OF THE INVENTION

The present invention relates to an automated vehicle which drives itself while detecting magnetic fluxes generated by magnetic nails that are embedded in a cruising lane with predetermined intervals and, more specifically, to a method of installing a magnetic sensor for detecting the magnetic fluxes generated by the magnetic nails.

BACKGROUND OF THE INVENTION

Currently under development is AHS (Automated Highway System) for automated driving control. It is a system in which various kinds of information are exchanged between an infrastructure installed in roads and vehicles, thereby continuously providing data and adding thereto vehicle control information, in order to achieve automated driving. Currently used as the infrastructure for providing the vehicle control information are magnetic nails, which are embedded in the road surface and whose positions are successively detected by a vehicle, whereby the position and orientation of the vehicle is recognized.

In order to enhance the stability and reliability in the automated vehicle in the AHS, it is necessary to detect the magnetic nails more securely. This may be achieved by a technique in which the magnetic force of each of the magnetic nails embedded in a cruising lane with predetermined intervals is enhanced so that the magnetic sensor can detect it more securely, and a technique in which the magnetic sensor attached to the lower face of the vehicle body is positioned as close to the magnetic nails as possible so that the magnetic flux density increases to allow the current generated by electromagnetic induction to be detected more securely.

Since a magnetic nail is made of a permanent magnet, from the viewpoint of its size and cost, it is physically and structurally too restricted to increase the magnetic force generated thereby. Thus preferred as the technique for detecting the magnetism of magnetic nails is a method in which the magnetic sensor is positioned as close to the magnetic nails embedded in the road surface as possible. Since it has empirically been known that the magnetic force of the conventional magnetic nail cannot be distinguished from geomagnetism when the magnetic sensor is separated from the magnetic nail surface on the road by about 15 cm or more, it is necessary for the magnetic sensor to be positioned with a shorter distance to the magnetic nail surface.

Also, when a vehicle is running, due to damping thereof, the distance from the road surface to the magnetic sensor may vary, whereby the magnetic sensor may fail to detect magnetic nails. Accordingly, it is desirable that the magnetic sensor be positioned as close to the road surface as possible in order to achieve more secure detection. Nevertheless, when the magnetic sensor is positioned close to the road surface of a cruising lane in order to detect magnetism more securely, the road clearance of the vehicle may greatly fluctuate due to the damping and pitching of the vehicle, irregularities of the road surface, or the like, whereby the magnetic nails may not be detected stably.

SUMMARY OF THE INVENTION

In view of these problems, it is an object of the present invention to provide an automated vehicle which, when driving itself by means of a magnetic sensor, can improve its accuracy in magnetic detection and can stably detect magnetic nails even in the case where the vehicle body moves up and down.

In order to achieve the above-mentioned object, the present invention provides an automated vehicle for performing automated driving control while successively detecting magnetic fluxes caused by magnetic nails embedded in a cruising lane at predetermined intervals, the automated vehicle comprising a magnetic sensor for detecting the magnetic fluxes caused by the magnetic nails, and sensor moving means for vertically moving the magnetic sensor in response to a change in a road clearance of the vehicle so as to keep a constant clearance between the magnetic sensor and each of the magnetic nails.

The automated vehicle in accordance with the present invention drives itself on a road in which magnetic nails are embedded, while detecting the magnetism (magnetic flux) of the magnetic nails. During this self-driving operation, when the vehicle moves up and down due to the damping and pitching of the vehicle, irregularities of the road surface, or the like, the sensor moving means is actuated so as to vertically move the magnetic sensor in response to such a vertical movement of the vehicle, whereby the clearance between the magnetic sensor and each of the magnetic nails (road surface) is kept constant. As a result, even when the vehicle moves up and down during cruising, the magnetic sensor can detect the magnetic nails without hindrance.

Preferably, the magnetic sensor is configured so that it can be moved up to an accommodating position which is separated upward from the road surface, where it can be accommodated in the vehicle body; the automated vehicle further comprises lane detecting means for detecting whether or not the vehicle is on a cruising lane in which the magnetic nails are embedded; and, when the lane detecting means detects that the vehicle is running on the cruising lane in which the magnetic nails are embedded, the sensor moving means moves down the magnetic sensor from the accommodating position so as to set the clearance between the magnetic sensor and each of the magnetic nails to a level at which the magnetism of the magnetic nails can be detected.

In this configuration, the magnetic sensor can be caused to descend so as to detect magnetic nails only when the vehicle is running on a cruising lane in which the magnetic nails are embedded, i.e., when the vehicle is running on a cruising lane where it can drive itself while detecting the magnetic nails; whereas it is accommodated in the vehicle body in the other instances.

Also, when the vehicle shifts from a normal cruising lane (where no magnetic nail is embedded) to a cruising lane in which magnetic nails are embedded, the magnetic sensor can be automatically moved down so as to start automated driving while detecting the magnetic nails. When it is detected that the vehicle is not running on the magnetic-nail-embedded cruising lane anymore, the magnetic sensor can be automatically moved up so as to be accommodated in the vehicle body at the accommodating position, thus preventing the magnetic sensor from being damaged when running on a bad road and the like.

Preferably, driving mode selecting means for selecting whether to perform automated driving or manual driving is provided; and, when the manual driving operation is selected by the driving mode selecting means, the magnetic sensor is moved to the accommodating position separated upward from the road surface. Consequently, the magnetic sensor can be projected downward only when the automated driving operation is to be performed; whereas it is moved up so as to be accommodated in the vehicle body at the accommodating position in the other instances.

Further, means for instructing accommodation of the magnetic sensor may be provided such that, when it is actuated, the magnetic sensor is moved to the accommodating position separated upward from the road surface. In this configuration, when automated driving is unnecessary, for example, a driver or the like can actuate the accommodation instructing means so as to move up the magnetic sensor and accommodate it in the vehicle body at the accommodating position. Also, when the vehicle is running on a bad road or the like, the accommodation instructing means may be actuated so as to accommodate the magnetic sensor, thereby preventing it from being damaged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention wherein.

DESCRIPTION OF THE PREFERRED EMBODIMENTS

In the following, preferred embodiments of the present invention will be explained with reference to the accompanying drawings. First, a cruising lane on which the automated vehicle in accordance with the present invention drives itself will be explained with reference to FIGS. 1(a) and 1(b).

Figure 1:
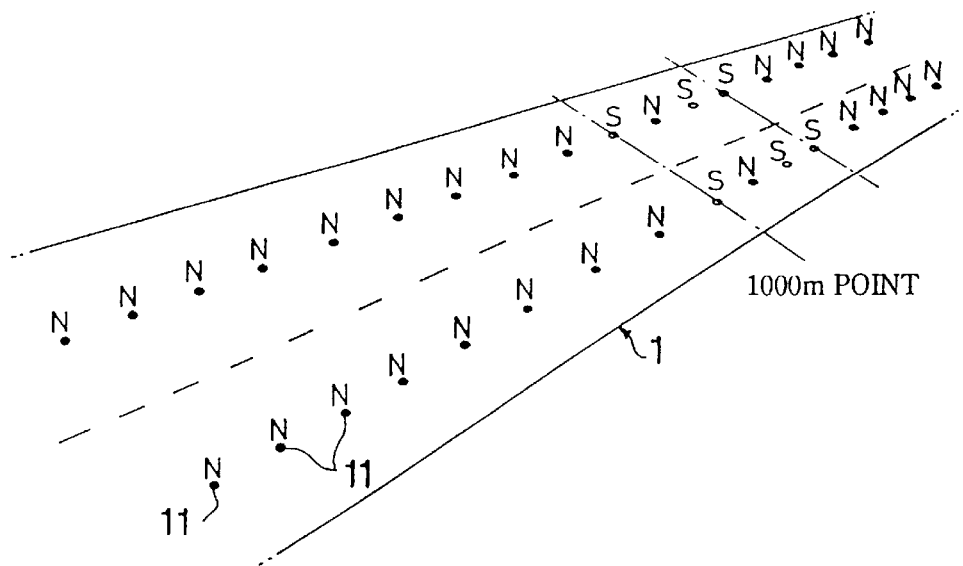
FIGS. 1(a) and 1(b) are schematic views showing a cruising lane in which magnetic nails are embedded.
Figure 1:
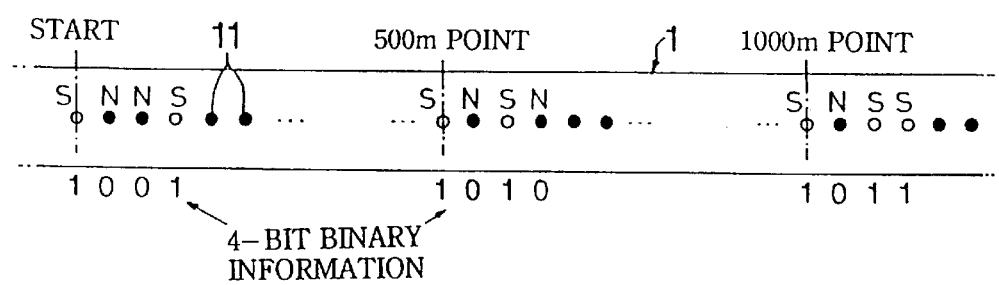

In the center portion of each cruising lane 1, magnetic nails 11 are embedded at intervals of about 1 m along the cruising, lane 1. The magnetic nails 11 are disposed with the same polarity (e.g., such that their north poles are oriented to the road surface side as shown in FIG. 1(a)). Also, disposed at intervals of about 500 m are sets of magnetic nails, each composed of one piece of check-purpose magnetic nail (whose south pole is oriented to the road surface side in FIG. 1(a)) and three pieces of magnetic nails for expressing binary numbers by utilizing reversal of north and south poles, whereby the four magnetic nails in each set form a four-bit local information value (see FIG. 1(b)). An automated vehicle 2 runs on the cruising lane 1 while sandwiching the magnetic nails 11 between its right and left wheels and detecting magnetism at the lower side of the vehicle body.

Figure 2:
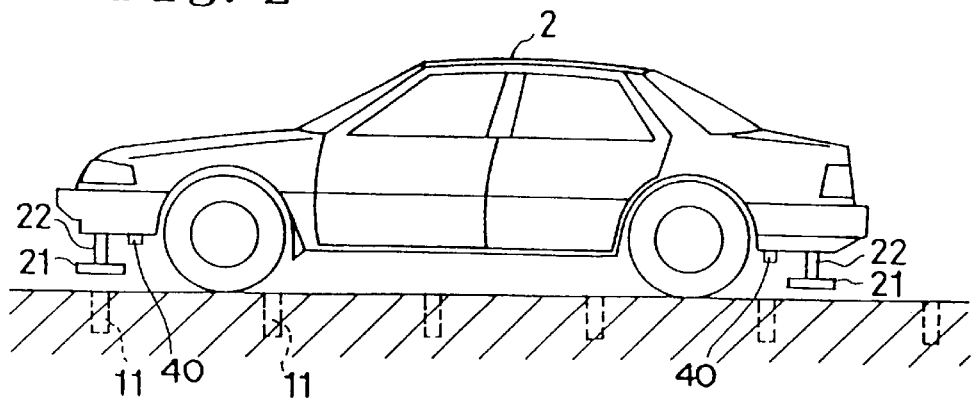
FIG. 2 is an exterior side view of a vehicle showing where magnetic sensors are attached.

As shown in FIG. 2, the automated vehicle 2 is constituted as a normal vehicle, and magnetic nail sensors 21 each of which is attached to the lower side of the vehicle body by a sensor moving means 20 (see FIG. 5) so as to freely project (descend) and retract. In order to define the running direction of the automated vehicle 2, a pair of magnetic nail sensors 21 are respectively attached to the front and rear of its body, and a pair of clearance sensors 40 are similarly attached thereto.

Figure 3:
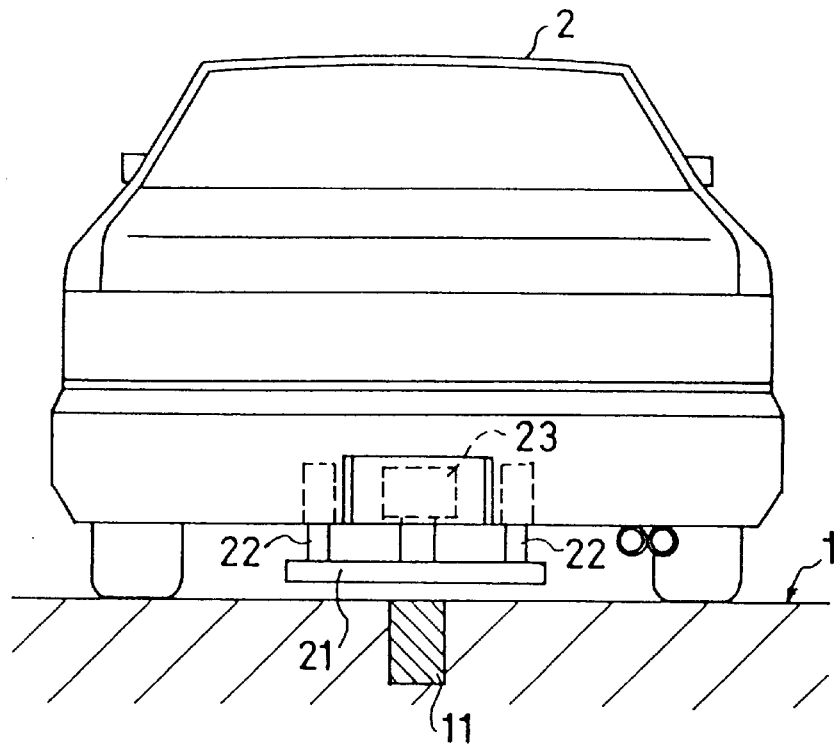
FIGS. 3(a) and 3(b) are rear views respectively of a vehicle showing detecting and accommodating positions of a magnetic sensor.
Figure 3:
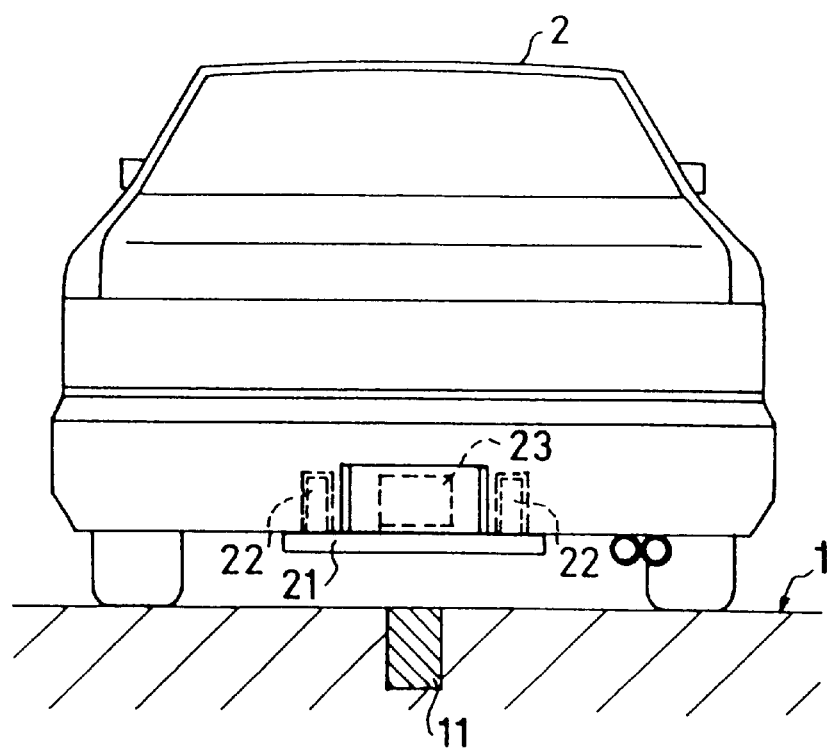

As shown in FIGS. 3(a) and 3(b), the sensor moving means 20 is constituted by a pair of telescopic columnar members 22, whose tips are attached to the magnetic nail sensor 21, and an actuator 23 for telescopically driving the columnar members 22. Each telescopic columnar member 22 is constituted as a cylindrical form whose base part is attached to the lower side of the body of the automated vehicle 2 while the tip part can descend from the body side toward the road surface and extend to a predetermined detecting position (position at the lower side of the vehicle body which is separated upward by 15 cm from the road surface in this embodiment). To the Lip portions of the pair of tip parts, the magnetic sensor 21 is attached substantially in parallel with the road surface of the cruising lane 1.

The actuator 23 is constituted as an electric motor 231 (see FIG. 5) such as stepping motor. The rotation of the motor 231 is converted into a linear movement, thereby extending the cylindrical columnar member 22 and lowering the magnetic nail sensor 21 to the detecting position toward the cruising road surface. When the motor 231 is rotated in reverse, the magnetic nail sensor 21 is accommodated in the lower side of the vehicle body at the accommodating position (position in contact with the lower side of the vehicle body in this embodiment). FIG. 3(b) is a rear view showing the state where the magnetic nail sensor 21 is accommodated in the vehicle body, whereas FIG. 3(a) is a rear view showing the state where the magnetic nail sensor 21 projects from the vehicle body toward the road surface of the cruising lane 1 so as to be able to detect the magnetic flux caused by the magnetic nail 11.

As the power supply for the actuator 23, a vehicle battery B is used so as to be connected to the motor 231 that is employed as the actuator. A motor driving circuit 26 of the motor 231 (which constitutes a part of the sensor moving means 20; see FIG. 5) comprises the battery B, a switching circuit 25 for switching the direction of current supplied from the battery B, and a relay switch 24. When the relay switch 24 is closed, the armature circuit of the motor 231 receives the current supplied from the battery B, whereby the motor 231 is driven to rotate. Also, the switching circuit 25 can reverse the direction of armature current, thus controlling the normal and reverse rotations of the motor 231. Here, the on/off control of the relay switch 24 and the switching control of the switching circuit 25 are electrically regulated by a manual selecting switch, provided in a driving cabin of the automated vehicle in accordance with the present invention, for selecting whether or not magnetic nail sensing is performed, or by a logic circuit in the automated driving system.

The clearance sensor 40 is an ultrasonic sensor, which outputs an ultrasonic pulse onto a road surface and detects, in real time, the road clearance according to a wave reflected from the road surface. In response to a thus detected change in road clearance, the height of the magnetic nail sensor is regulated by feedback control so as to constantly keep the target level of 15 cm. Namely, in this embodiment, the distance (height) of the magnetic nail sensor from the road surface is controlled so as to be constantly held at 15 cm. For example, in the case where the normal road clearance is 20 cm, when it is detected by the clearance sensor 40 that the road clearance has become 15 cm during cruising, control is effected such that the magnetic nail sensor 21 is moved up from the normal position by 5 cm.

Figure 4:
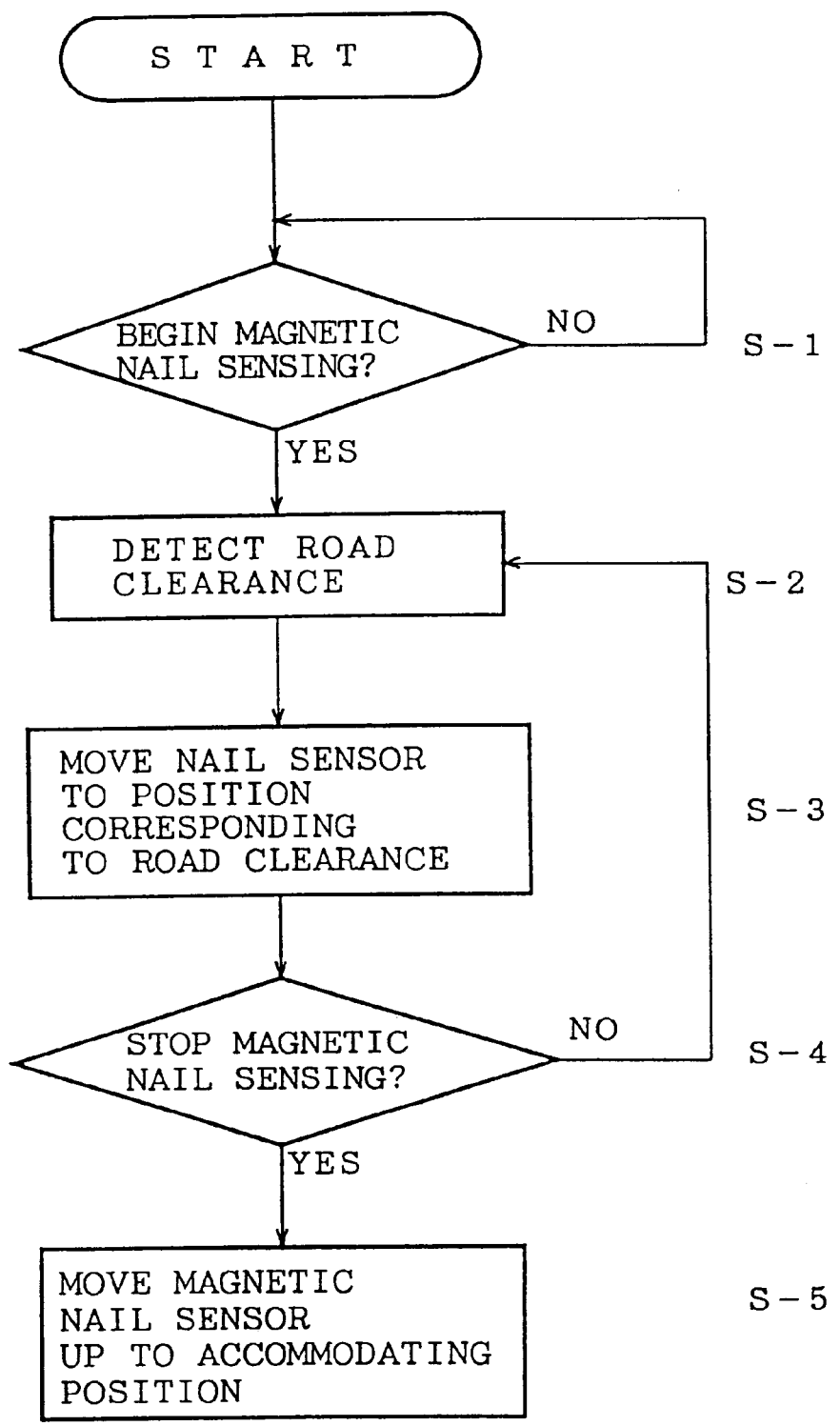
FIG. 4 is a flowchart of a basic automated driving control system in accordance with the present invention.

FIG. 4 shows a flowchart of a basic automated driving control system in accordance with the present invention. As shown in this flowchart, when a driver volitionally decides to perform automated driving by conducting magnetic nail sensing during driving on the cruising lane 1 in which the magnetic nails 11 are embedded, a manual selecting switch (not shown) provided in the driving cabin is shifted to the magnetic nail sensing side (s-1).

Then, road clearance values detected by the clearance sensors 40 in the front and rear ends of the vehicle body are read out (s-2). Subsequently, the switching circuit 25 is switched such that the motor 231 is rotated (normally) so as to descend its corresponding magnetic nail sensor 21 from the accommodating position to the detecting position. Consequently, the magnetic nail sensor 21 projects from its accommodating position in the vehicle body toward the road surface of the cruising lane 1 so as to descend to the detecting position that is about 15 cm above the road surface (s-3). When the magnetic nail sensor 21 is set to this detecting position, it can perform magnetic sensing.

In the case where the road clearance changes due to the damping and pitching of the vehicle, irregularities of the road surface, a sloping road, or the like during the automated driving in which the magnetic nail sensor 21 performs magnetic nail sensing, the position of the magnetic nail sensor 21 is regulated in response to the change in road clearance, so that the distance from the road surface to the magnetic nail sensor 21 is always kept at 15 cm (s-2, s-3, and s-4).

In the case where the vehicle is out of the cruising lane in which the magnetic nails 11 are embedded or in the case where the driver decides to perform manual cruising, a magnetic sensor accommodation instructing switch provided in the driving cabin is turned on (s-4). Then, the switching circuit 25 is switched such that the motor 231 is rotated (in reverse) so as to accommodate the magnetic nail sensor 21 at the accommodating position. Consequently, the magnetic nail sensor 21 ascends to the accommodating position in the vehicle body (s-5). When the magnetic sensor 21 is accommodated in the accommodating position, current is stopped from being supplied to the motor 231, thereby resuming a waiting state from which magnetic nail sensing can be selected.

Figure 5:
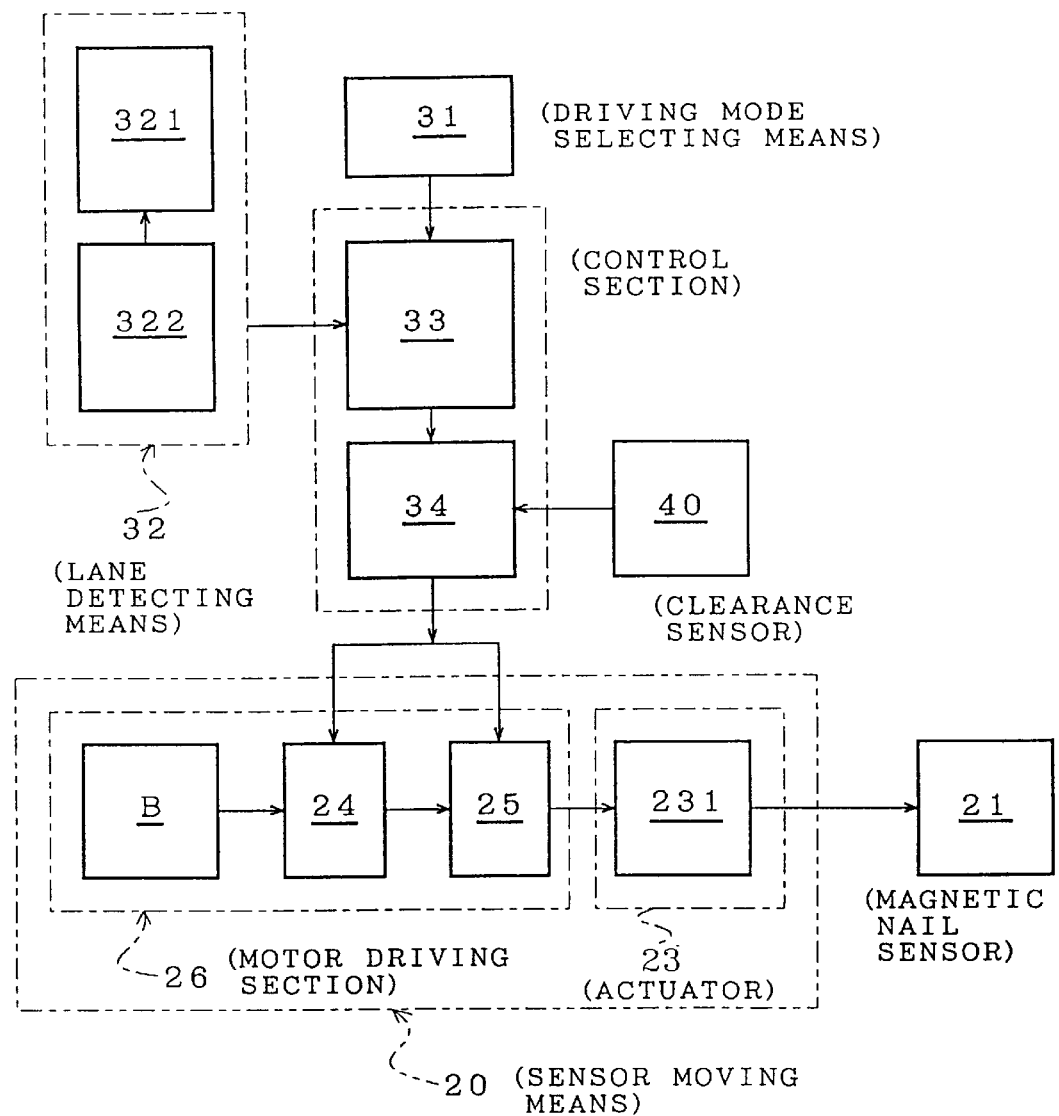
FIG. 5 is a configurational view showing the automated driving control system in accordance with an embodiment of the present invention.
Figure 6:
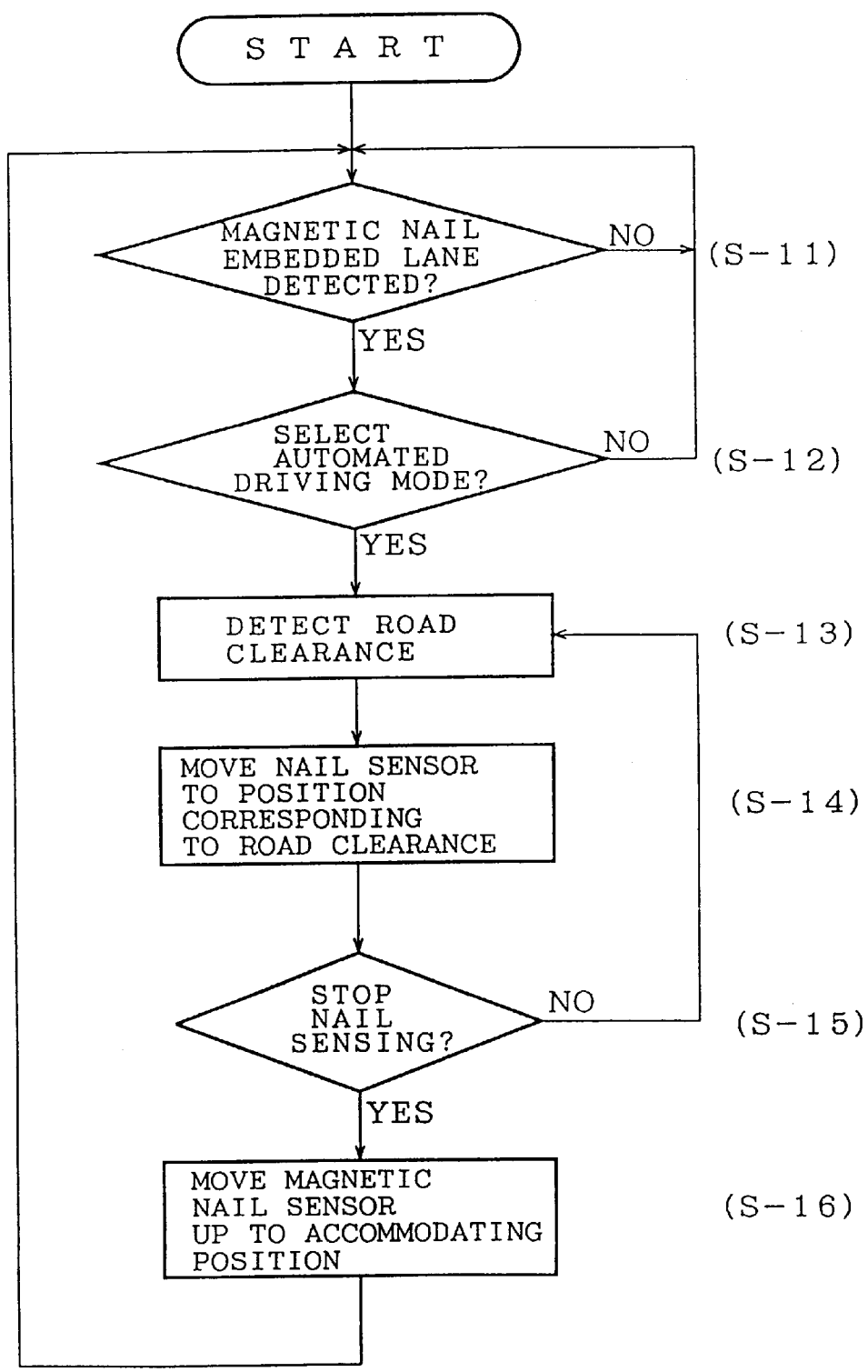
FIG. 6 is a flowchart showing the automated driving control system in accordance with an embodiment of the present invention.

FIG. 5 is a configurational view showing a preferable automated driving control system in accordance with the present invention. It utilizes, as a constituent therein, a navigation system incorporated in a vehicle.

This automated driving control system comprises a driving mode selecting switch 31 which is operated by a driver who volitionally decides whether to perform manual driving or automated driving; a lane detecting means 32 constituted by a vehicle position detecting means 321 for detecting the position of the vehicle by using GPS, for example, and a map information storing means 322 storing information about the cruising lane in which the magnetic nails 11 are embedded; a driving control section 33 for judging whether or not to perform automated driving according to outputs from the driving mode selecting switch 31 and lane detecting means 32; a sensor position control section 34 for appropriately determining the position of the magnetic nail sensor 21 so as to regulate its vertical movement; and a clearance sensor 40.

Operations of thus configured automated driving control system will be explained with reference to the flowchart of FIG. 5. Before or during cruising, the driver actuates the lane detecting means 32 that utilizes the navigation system, thereby detecting the position of the vehicle according to the vehicle position detecting means 321. The detected vehicle position is displayed on map data stored in the map information storing means 322. The stored map data include not only predetermined road information but also information about whether or not each road has the cruising lane 1 in which the magnetic nails are embedded, thus allowing to judge whether or not the vehicle is currently running on the cruising lane 1 in which the magnetic nails 11 are embedded. To this end, the outputs of the vehicle position detecting means 321 and map information storing means 322 are fed into the driving control section 33, where it is judged whether or not the vehicle is running on the cruising lane 1 in which the magnetic nails 11 are embedded (s-11).

When the driving control section 33 detects that the vehicle is on the cruising lane 1, it informs the driver that automated driving is possible. Then, the driver volitionally decides whether to perform manual driving or automated driving by magnetic nail sensing (s-12). When the driver does not choose the automated driving mode, it is unnecessary for the magnetic nail sensor 21 to be moved, whereby the automated driving control system is placed in a waiting state for automated driving.

In this state, when the driver operates the driving mode selecting switch 31 so as to choose automated driving, the driving control section 33 outputs an instruction for performing automated driving to the sensor position control section 34, whereby the latter closes the relay switch 24 of the above-mentioned motor driving circuit 26 and switches the switching circuit 25 to the normal rotation side so that the magnetic nail sensor 21 descends from the accommodating position in the vehicle body to the detecting position on the road surface side of the cruising lane 1, thus allowing the magnetic nail sensor 21 to detect the magnetic flux caused by the magnetic nails 11 (s-13 and s-14).

In the case where the driver has operated the driving mode selecting switch 31 so as to choose the automated driving mode beforehand, the driving control section 33 automatically switches to the automated driving mode when it detects that the vehicle is on the cruising lane 1, thereby outputting an instruction for automated driving to the sensor position control section 34 so as to move down the magnetic nail sensor 21 to the above-mentioned detecting position.

Subsequently, as with the controls of s-2, s-3, and s-4 in the flowchart of FIG. 4, control is effected such that the distance from the road surface to the magnetic nail sensor is constantly held at 15 cm (s-13, s-14, and s-15), whereby magnetic nail sensing is effected correctly, thus enabling automated driving control along a cruising lane in which magnetic nails are embedded.

Thereafter, in the case where the cruising lane 1 is terminated or in the case where the driver wishes manual driving, the driver operates the driving mode selecting switch 31 so as to choose manual driving (s-15). When this selection is made, the driving control section 33 outputs to the sensor position control section 34 an instruction for moving up the magnetic nail sensor 21, which has descended from the vehicle body side to the detecting position on the road surface side of the cruising lane, to the accommodating position on the body side, thus switching the switching circuit 25 to the reverse rotation side (s-16). As a result, magnetic nail sensing is stopped. Thereafter, when it is detected that the magnetic nail sensor 21 has reached the accommodating position, the relay switch 24 is opened.

According to such operations, the driver can volitionally select whether to perform manual driving or automated driving, and the lane detecting means 32 provided within the vehicle can automatically judge whether or not the vehicle is running on the cruising lane 1 in which the magnetic nails 11 are embedded, allowing manual driving to automatically shift Lo automated driving.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automated vehicle for performing automated driving control while successively detecting magnetic fluxes caused by magnetic nails embedded in a cruising lane at predetermined intervals, said automated vehicle comprising:

a magnetic sensor for detecting the magnetic fluxes caused by said magnetic nails;

a clearance sensor for detecting a road clearance of said vehicle; and sensor moving means for vertically moving said magnetic sensor in response to a change in a value detected by said clearance sensor so as to keep a constant clearance between said magnetic sensor and each of said magnetic nails.

2. An automated vehicle according to claim 1, wherein said clearance sensor is a sensor which outputs an ultrasonic pulse from a body of said vehicle onto a road surface and detects the road clearance according to a wave reflected from said road surface.

3. An automated vehicle according to claim 1, wherein said magnetic sensor can be moved up to an accommodating position which is separated upward from a road surface, where said magnetic sensor can be accommodated in a body of said vehicle;

wherein said automated vehicle further comprises lane detecting means for detecting whether or not said vehicle is on said cruising lane in which said magnetic nails are embedded; and wherein, when said lane detecting means detects that said vehicle is running on said cruising lane in which said magnetic nails are embedded, said sensor moving means moves said magnetic sensor down from said accommodating position so as to set the clearance between said magnetic sensor and each of said magnetic nails to a level at which a magnetism of said magnetic nails can be detected.

4. An automated vehicle according to claim 3, further comprising driving mode selecting means for selecting whether to perform automated driving or manual driving;

wherein, in a case where a manual driving mode is selected by said driving mode selecting means, when said lane detecting means detects that said vehicle is running on said cruising lane in which said magnetic nails are embedded, said sensor moving means automatically moves said magnetic sensor down from said accommodating position so as to set the clearance between said magnetic sensor and each of said magnetic nails to a level at which a magnetism of said magnetic nails can be detected.

5. An automated vehicle according to claim 3, further comprising a navigation device for detecting a position of said vehicle during cruising, wherein said lane detecting means judges, according to information about vehicle position detected by said navigation device, whether or not said vehicle is running on said cruising lane in which said magnetic nails are embedded.

6. An automated vehicle according to claim 1, further comprising driving mode selecting means for selecting whether to perform automated driving or manual driving;

wherein, when a manual driving mode is selected by said driving mode selecting means, said magnetic sensor is moved to an accommodating position separated upward from a road surface.

7. An automated vehicle according to claim 1, further comprising means for instructing accommodation of said magnetic sensor;

wherein, when said accommodation instructing means is actuated, said magnetic sensor is moved to an accommodating position separated upward from a road surface.

* * * * *